United States Patent
Jin et al.

(10) Patent No.: US 8,965,844 B2
(45) Date of Patent: Feb. 24, 2015

(54) APPARATUSES AND METHODS FOR SHARING CONTENTS

(75) Inventors: Young Kyu Jin, Seoul (KR); Seung Eok Choi, Suwon-si (KR); Nam Wook Kang, Seoul (KR); Sin Ae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 12/850,176

(22) Filed: Aug. 4, 2010

(65) Prior Publication Data

US 2011/0218996 A1 Sep. 8, 2011

(30) Foreign Application Priority Data

Mar. 2, 2010 (KR) ........................ 10-2010-0018524

(51) Int. Cl.
  *G06F 17/30* (2006.01)
  *G06F 15/16* (2006.01)

(52) U.S. Cl.
  CPC ................ *G06F 15/16* (2013.01); *G06F 17/30* (2013.01)
  USPC ........................................................ 707/610

(58) Field of Classification Search
  CPC ................................................ G06F 17/30165
  USPC ........................................... 707/610, 783–785
  See application file for complete search history.

(56) References Cited

U.S. PATENT DOCUMENTS

| | | | | |
|---|---|---|---|---|
| 7,840,650 | B2* | 11/2010 | Levin | 709/219 |
| 2004/0230663 | A1* | 11/2004 | Ackerman | 709/207 |
| 2005/0114784 | A1* | 5/2005 | Spring et al. | 715/762 |
| 2008/0021876 | A1* | 1/2008 | Ahern et al. | 707/3 |
| 2008/0215985 | A1* | 9/2008 | Batchelder et al. | 715/731 |
| 2008/0294774 | A1* | 11/2008 | Fowler et al. | 709/225 |
| 2009/0100068 | A1* | 4/2009 | Gauba et al. | 707/10 |
| 2010/0005119 | A1* | 1/2010 | Howard et al. | 707/104.1 |
| 2011/0061099 | A1* | 3/2011 | Jiang et al. | 726/12 |
| 2011/0271000 | A1* | 11/2011 | Anderson et al. | 709/228 |

FOREIGN PATENT DOCUMENTS

| | | |
|---|---|---|
| JP | 2009-146366 | 7/2009 |
| KR | 10-2004-0096289 | 11/2004 |
| KR | 10-2006-0001902 | 1/2006 |
| KR | 10-2006-0034121 | 4/2006 |
| KR | 10-2008-0040127 | 5/2008 |
| KR | 10-2008-0108709 | 12/2008 |
| KR | 10-2009-0001733 | 1/2009 |

* cited by examiner

*Primary Examiner* — Khanh Pham
(74) *Attorney, Agent, or Firm* — NSIP Law

(57) ABSTRACT

An apparatus and method for sharing contents are provided. The apparatus and method may store contents; receive a selection signal for content selected from among the contents; classify the selected content into groups; and generate a service code for each respective group.

21 Claims, 7 Drawing Sheets

FIG. 3

```
code: 00195131
share
PIC00112.jpg
PIC00121.jpg
PIC00122.jpg
PIC00123.jpg
PIC00124.jpg
PIC00131.jpg
-end of code
```

```
code: 20050319
print
PIC00112.jpg
PIC00121.jpg
PIC00122.jpg
PIC00123.jpg
PIC00124.jpg
PIC00131.jpg
-end of code
```

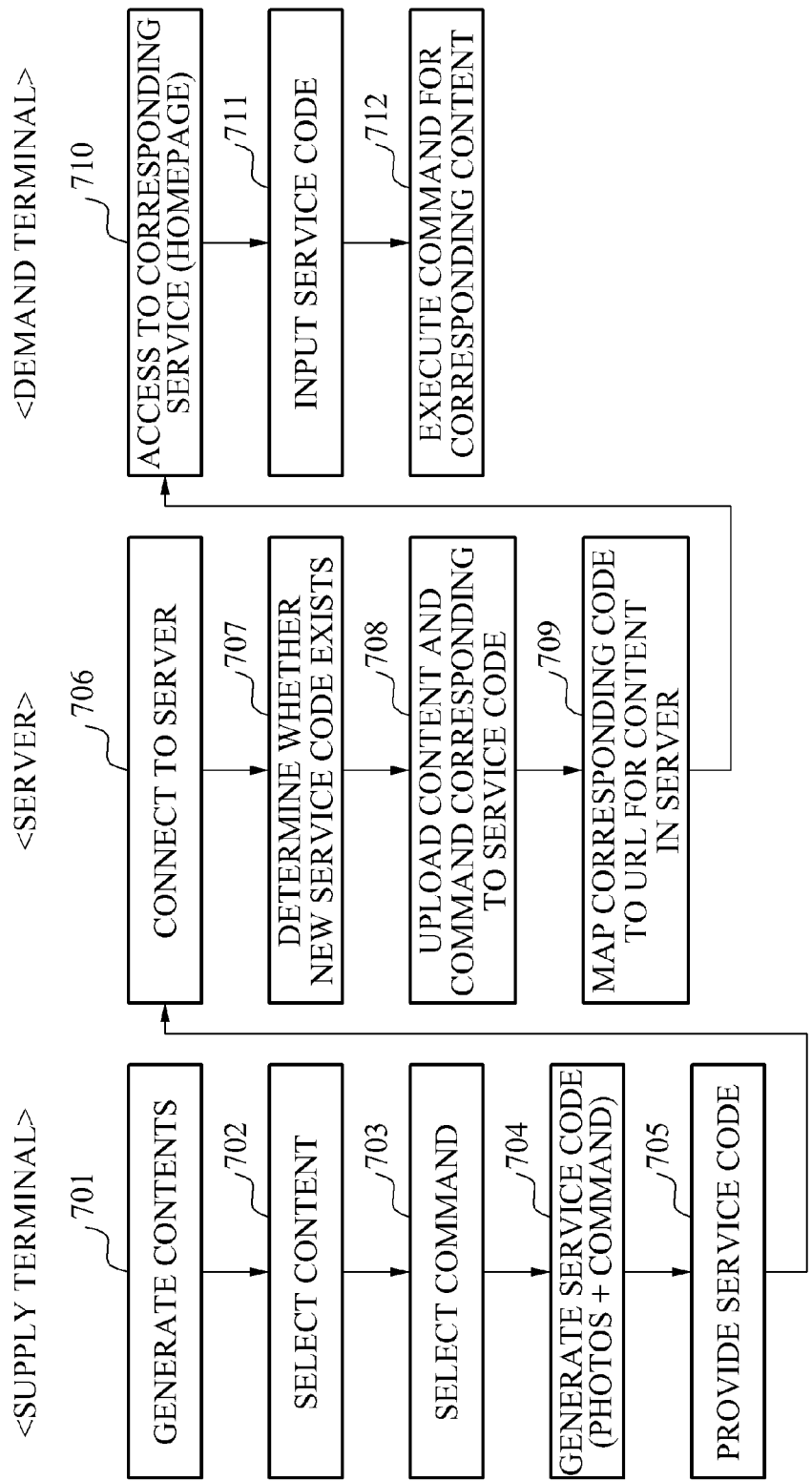

APPARATUSES AND METHODS FOR SHARING CONTENTS

CROSS-REFERENCE TO RELATED APPLICATION(S)

This application claims the benefit under 35 U.S.C. §119(a) of Korean Patent Application No. 10-2010-0018524, filed on Mar. 2, 2010, in the Korean Intellectual Property Office, the entire disclosure of which is incorporated herein by reference for all purposes.

BACKGROUND

1. Field

The following description relates to an apparatus and method for sharing contents, and more particularly, to an apparatus and method for sharing contents that are classified by a service code.

2. Description of Related Art

With the transition from the analog era to the digital age, information sharing technologies are being developed so that users may share a variety of contents. Also, the devices and methods used for sharing contents in communication technologies are under rapid development. Accordingly, the sharing of digital contents may be considered to be as important as the generation of digital contents.

However, sharing digital contents can often be difficult. For example, photo contents converted from an analog form to a digital form may be shared using technologies that include generating, storing, and sharing contents using a plurality of web services, e-mailing, online storage, and the like. Not everyone is familiar with digital devices, and several operations may be required even when people are familiar with digital devices, thus making the operation of these devices cumbersome and time consuming.

For example, to share digital contents, a user may take a picture, upload the picture to his or her computer, and send the picture to someone the user desires to share the picture with, for example, through e-mailing. The other user may download the picture by checking an e-mail message. The process requires multiple steps including the need to attach a camera to your computer to store the picture on your computer, and the need to generate an email attaching the photo. This process is often time-consuming, and requires one to be around a computer.

In addition, users may store only a certain amount of photo contents in their digital camera until the memory capacity of the digital camera is full. Also, there are other limitations, for example, you need to know the email address of the person you wish to share the photo with, and the contents may be too large to be transmitted via an e-mail message.

Furthermore, there are potential setbacks such as when photos are deleted, an e-mail message is delayed, or when photos are not stored properly in a computer.

SUMMARY

In one general aspect, there is provided an apparatus for sharing contents, the apparatus comprising a storage unit configured to store contents, a content selector configured to receive a selection signal for content selected from among the stored contents, a group generator configured to classify the selected content into one or more groups, and a code generator to generate a service code for each respective group.

The apparatus may further comprise a list output unit configured to output a command list for the groups, wherein the command list comprises at least one of a content download command, a content preview command, a content print command, and a content playback command.

The service code may comprise at least one of a letter code, a numeric code, an alphanumeric code, a two-dimensional (2D) code, a barcode, and a Radio-Frequency Identification (RFID) service code.

The apparatus may further comprise an output unit configured to output the service code.

The output unit may comprise a display unit configured to display the service code on a screen, and an image output unit configured to convert the service code to image information and to output the image information.

The service code converted to the image information may comprise at least one of a thumbnail and a code generation date.

In another aspect, there is provided a content sharing server, the server comprising a connector configured to check whether synchronization with a terminal is performed, wherein the terminal maintains a service code for contents, a service code checker configured to check a service code generation history and to determine whether a new service code is generated, when the synchronization with the terminal is performed, and a content uploading unit configured to upload the service code and contents associated with the service code, when the new service code is determined to be generated.

The service code may classify contents into groups and assigns a code corresponding to a command list to each respective group.

When the terminal is synchronized through a wireless communication, the content uploading unit may automatically upload the service code and the contents based on setting information, and the setting information is set in advance.

The server may further comprise an address generator configured to generate a Uniform Resource Location (URL) for the uploaded contents.

The URL may comprise at least one of a domain identifier (ID), an ID of a user of the terminal, an ID of the terminal, and a day and time when the service code is uploaded.

The server may further comprise a table generator configured to generate a table, the table connecting the URL, the service code, and the command list with each other.

The server may further comprise a content extractor configured to extract the URL, the command list, and the contents from the table, when a signal requesting the contents associated with the service code is received.

The server may further comprise an authentication unit configured to perform a user authentication based on the extracted contents, and to provide the contents to a user that is successfully authenticated by the user authentication.

In another aspect, there is provide a method for sharing contents, the method comprising storing contents, receiving a selection signal for content selected from among the contents, classifying the selected content into groups, and generating a service code for each respective group.

The method may further comprise displaying the service code on a screen, and converting the service code to image information and outputting the image information.

In another aspect, there is provided a method for sharing contents, the method comprising checking whether a synchronization with a terminal is performed, wherein the terminal maintains a service code for contents, checking a service code generation history and determining whether a new service code is generated, when the synchronization with the terminal is performed, and uploading the service code and the contents associated with the service code, when the new service code is determined to be generated.

The service code may be generated by classifying the contents into groups and by assigning a code corresponding to a command list to each respective group.

The may further comprise extracting the contents associated with the service code, when a signal requesting the contents associated with the service code is received.

In another aspect, there is provided a computer-readable storage medium having stored therein program instructions configured to cause a processor to perform a method for sharing contents, the method comprising storing contents, receiving a selection signal for content selected from among the contents, classifying the selected content into groups, and generating a service code for each respective group.

Other features and aspects may be apparent from the following description, the drawings, and the claims.

BRIEF DESCRIPTION OF THE DRAWINGS

FIG. 3 is a diagram illustrating an example of a numeric service code.

FIG. 7 is a flowchart illustrating an example of a content sharing method between a supply terminal, a server, and a demand terminal.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

A content sharing apparatus according various examples may be classified as a terminal. The terminal may generate contents, and a service code may be used to classify the contents into groups. A content management server may receive the service code from the terminal, and may update the service code and contents so that the service code may be shared by other users.

Examples described herein are in a view of the terminal to generate contents and a service code used to classify the contents into groups.

Figure 1:
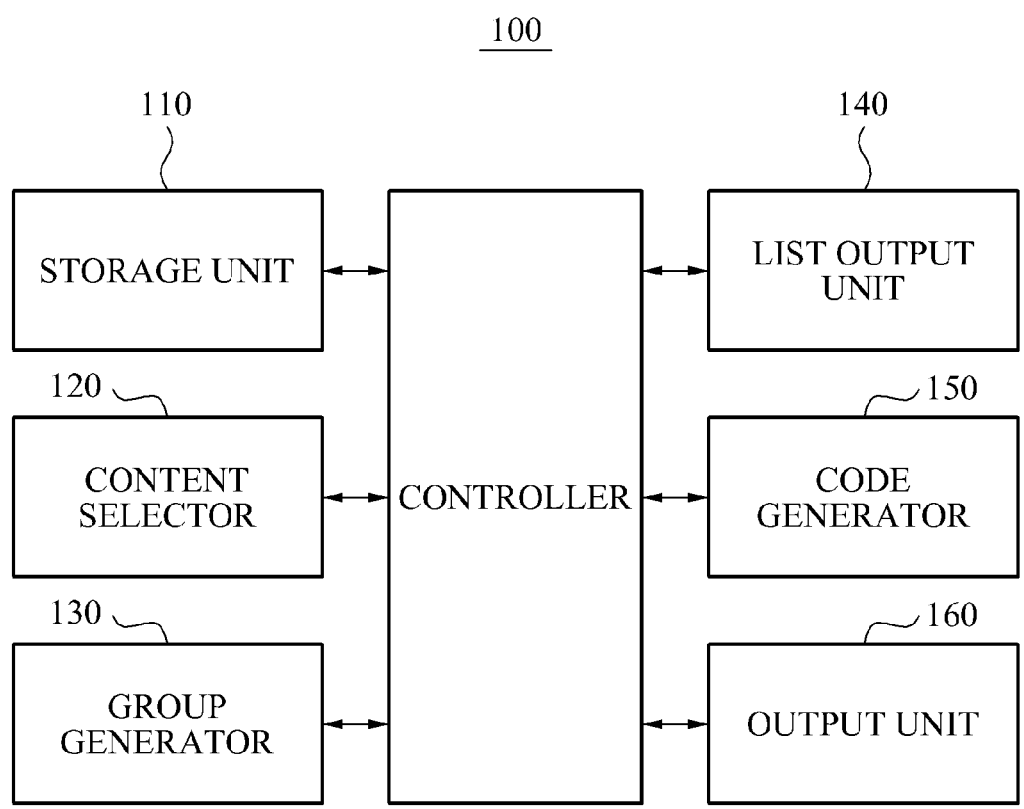
FIG. 1 is a diagram illustrating an example of a content sharing apparatus.
Figure 2:
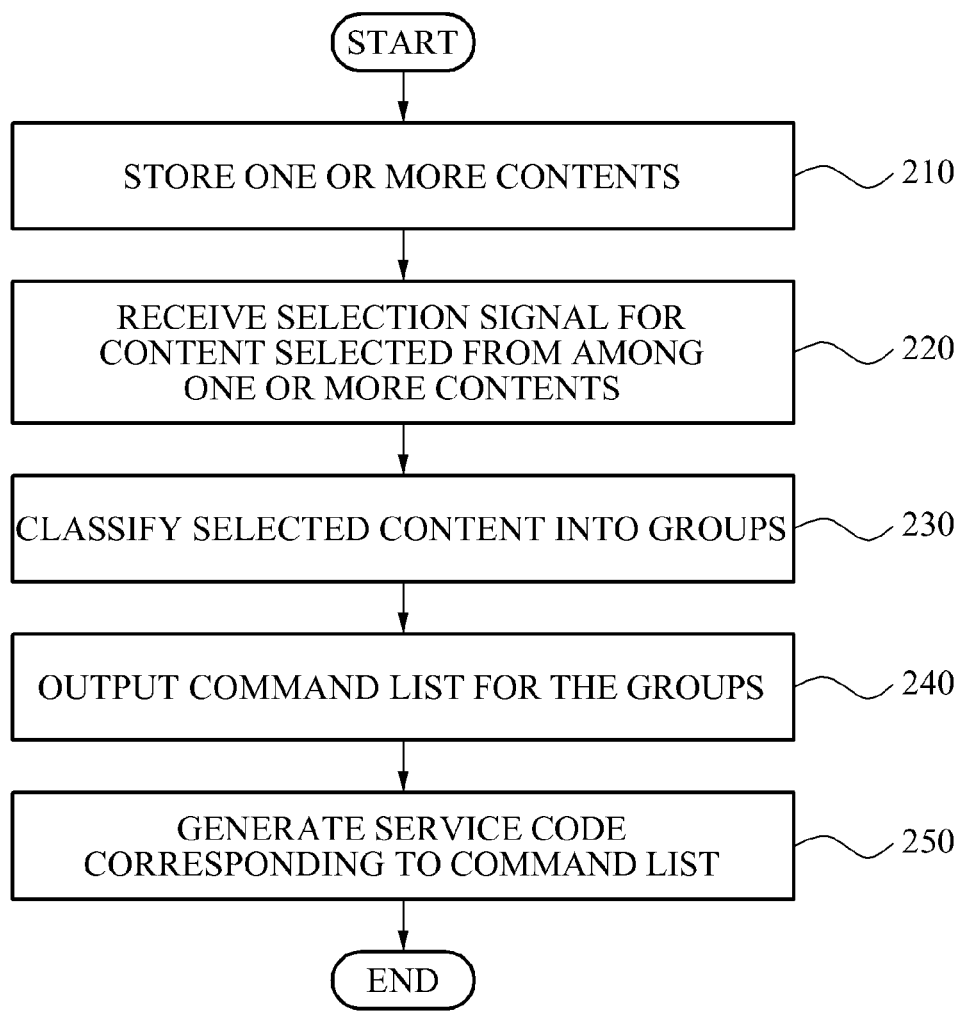
FIG. 2 is a flowchart illustrating an example of a content sharing method.

FIG. 1 illustrates an example of a content sharing apparatus, and FIG. 2 illustrates an example of a content sharing method.

Referring to FIG. 1, content sharing apparatus 100 includes a storage unit 110, a content selector 120, a group generator 130, a list output unit 140, and a code generator 150. The content sharing apparatus 100 as described herein may be a terminal, for example, a mobile phone, a digital camera, a personal digital assistant (PDA), a personal computer (PC), and the like.

A user that uses the content sharing apparatus 100 may control the terminal to generate contents, for example, image data, voice data, and the like. Referring to FIG. 2, the storage unit 110 may store the generated contents in operation 210.

In this example, the content sharing apparatus is a digital camera. A user may take a picture using the digital camera, and the camera may store one or more photos as data in a memory. The memory may be, for example, a storage unit of the digital camera.

Subsequently, the user may select a content from among the one or more contents stored on the content sharing apparatus 100. For example, the content selector 120 may receive a selection signal for the content selected from among the one or more contents in operation 220.

Accordingly, a user may select a photo to share with another user using a selection function of the digital camera. The selection function may vary depending on the type of content sharing apparatus 100. For example, the selection function may be implemented as a photo browsing function or a multi-selection function of the digital camera. Additionally, the selection function may be implemented by adding a "service code generation" menu to an application menu. Accordingly, the selection function may be implemented without the use of a separate user interface (UI).

In operation 230, the group generator 130 may classify the selected content into groups. Subsequently, in operation 240 the list output unit 140 may output a command list for the groups.

For example, when a user selects the service code generation menu, the content sharing apparatus 100 may display a list of commands for service codes set for each content type, as shown in the example of Table 1.

TABLE 1

| | Content type | | | | |
|---|---|---|---|---|---|
| Executable commands | Image | Moving image | Music/ Audio | Document | Interactive media (Games, etc.) |
| Download | ✓ | ✓ | ✓ | ✓ | ✓ |
| Streaming | | ✓ | ✓ | | |
| Print | ✓ | | | ✓ | |
| Execute | | | | | ✓ |
| Read Only | ✓ | | | ✓ | |
| Thumbnail Only | ✓ | ✓ | | | |
| Preview (Playback/ Execution for only predetermined time) | | ✓ | ✓ | | ✓ |

For example, when an image is selected as content, a user may select a download command that allows the user to download a copy of the image. In addition, a preview command may be selected to preview a thumbnail of the image, a print command may be selected to send output data to a printer, and the like.

As another example, when a moving image is selected as content, a user may select the download command to download the moving image, a streaming playback command to view the moving image, and the like.

In accordance with the example of a photo sharing scenario, when a user selects photos the user desires to share with people, the content sharing apparatus 100 may generate a list of the selected photos. The content sharing apparatus 100 may store the generated list together with sharing command information, and may generate a unique identifier (ID) for the sharing command information.

In other words, the code generator 150 may generate a service code corresponding to the command list, with respect to the groups of contents, in operation 250.

The service code may be provided in various forms, for example, a lettered code, a numeric code, an alphanumeric code, a two-dimensional (2D) code, a barcode, a Radio-Frequency Identification (RFID) service code, and the like.

FIG. 3 illustrates an example of a numeric service code.

Referring to FIGS. 1 and 3, the content sharing apparatus 100 may generate a service code as shown in FIG. 3. In FIG. 3, the content sharing apparatus 100 may automatically generate a service code "00195131" that corresponds to six photos that may be shared.

As another example, a user may enable the content sharing apparatus 100 to generate a service code "20050319" that corresponds to six photos that may be printed.

Additionally, the user of a terminal that wants to view or print the contents may search for the generated service code immediately after the service code is generated. An output unit 160 of the content sharing apparatus 100 may output the generated service code, based on a demand of a user.

The output unit 160 may display the service code on a screen using a display unit (not shown). Also, the output unit 160 may convert the service code to image information and may output the image information using an image output unit (not shown).

Figure 4:
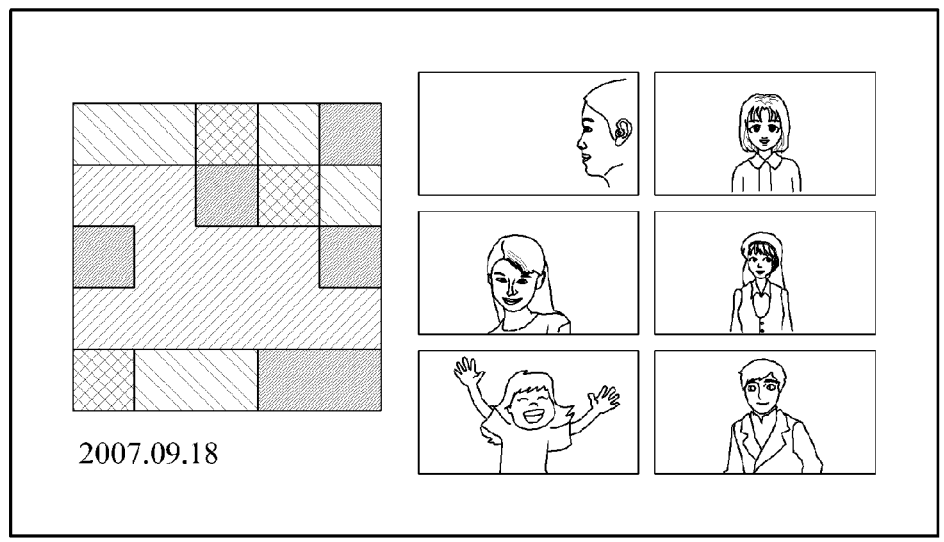
FIG. 4 is a diagram illustrating another example of an image file service code.

FIG. 4 illustrates another example of an image file service code.

Referring to FIGS. 1 and 4, the content sharing apparatus 100 may generate a service code as a separate image file, and may print the image file using a mobile printer.

To provide the service code as image information, the content sharing apparatus 100 may generate the service code, for example, in the form of a 2D code, such as a barcode that may be recognized by another content sharing apparatus. In some embodiments, the content sharing apparatus 100 may generate the service code so that the service code may contain information regarding thumbnails that correspond to contents to be shared, or regarding a code generation date.

Therefore, the user may transfer the service code generated as described above to a subject immediately after meeting the subject. For example, the user may transfer desired contents to people met in a conference or met while traveling, without exchanging personal information such as an e-mail address. Accordingly, the user of one terminal may share information immediately with a user of another terminal, without the need to exchange contact information.

For example, a user that desires to share content may select content to be shared and the content sharing apparatus 100 may generate a service code corresponding to the content to be shared. The content sharing apparatus 100 may synchronize with a server, and send the content to be shared along with the service code to the server. The user of the content sharing apparatus 100 may verbally communicate the service code to a second user of a different terminal. Accordingly, the second user may use their own respective terminal and input the service code into a menu on their own terminal, such as a web browser or an application, and retrieve the shared contents from the server.

Hereinafter, a content sharing server that may be used with the content sharing apparatus is described. The contents and service code generated by the above-described content sharing apparatus 100 may be uploaded to the server. Accordingly, a use of another terminal may receive the contents and service code through the server.

Figure 5:
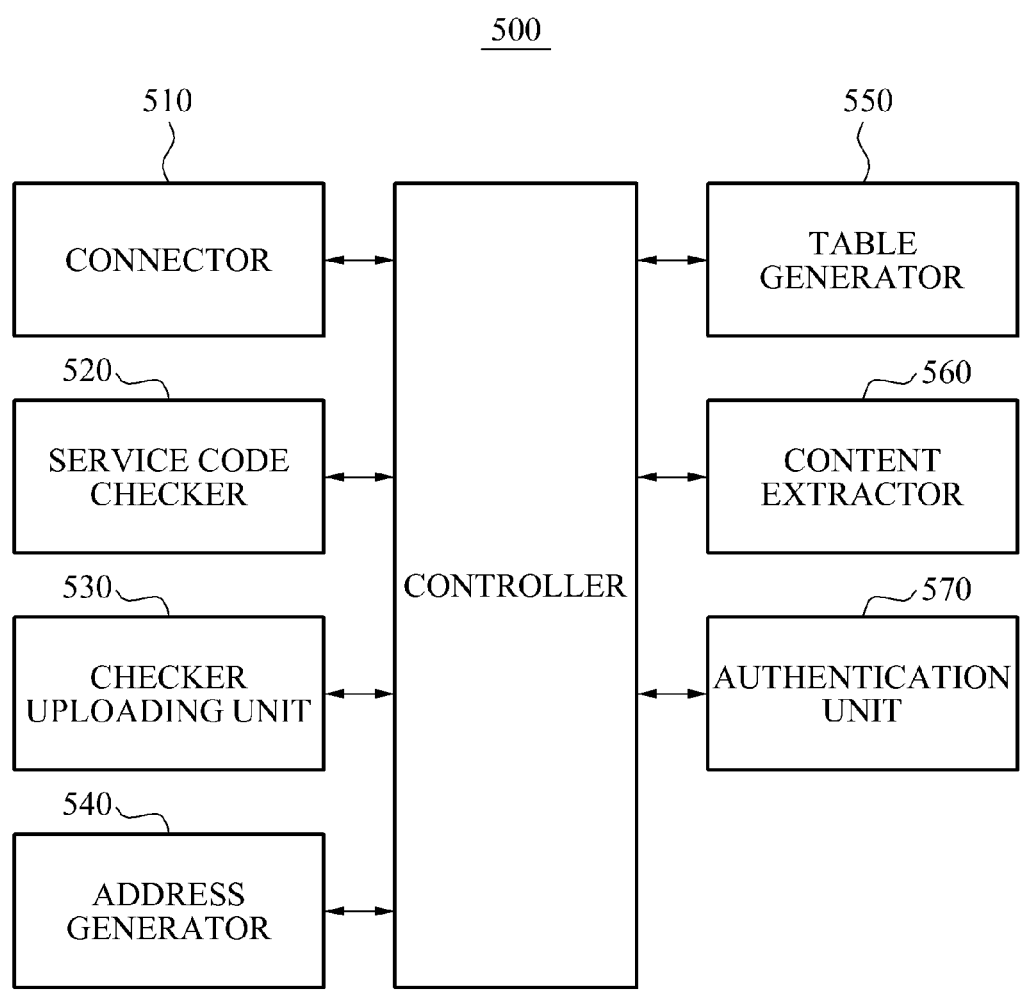
FIG. 5 is a diagram illustrating an example of a content sharing server.
Figure 6:
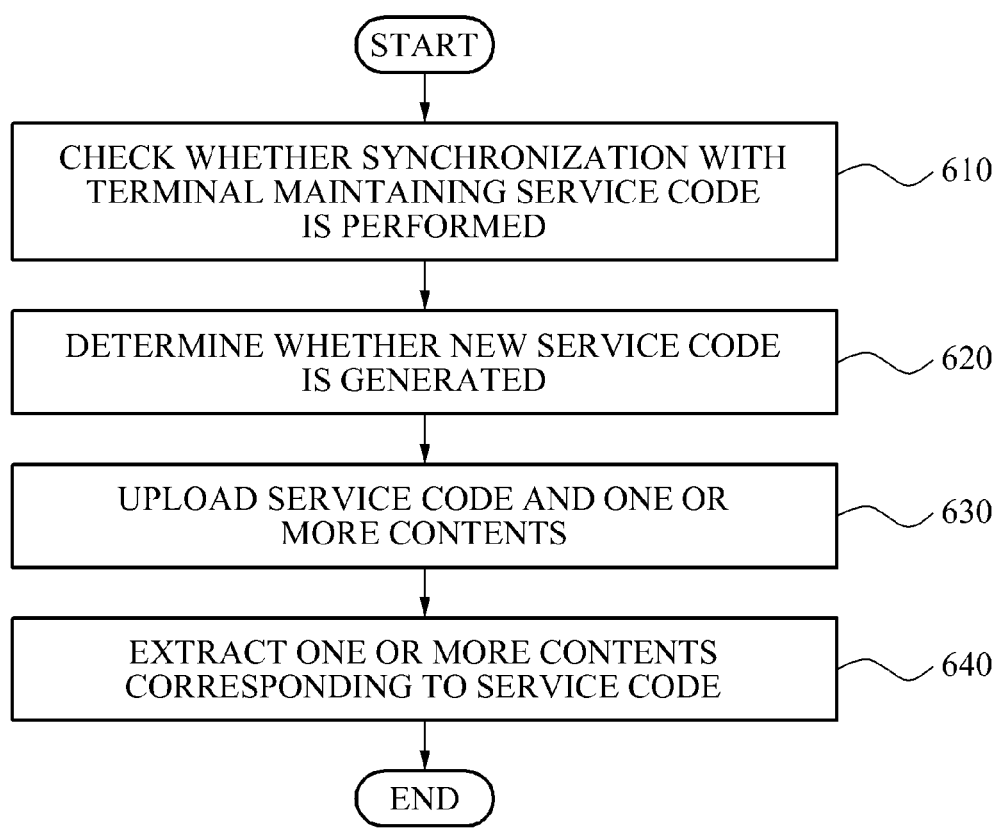
FIG. 6 is a flowchart illustrating another example of a content sharing method.

FIG. 5 illustrates an example of a content sharing server, and FIG. 6 illustrates another example of a content sharing method.

Referring to FIG. 5, the content sharing server 500 includes a connector 510, a service code checker 520, and a content uploading unit 530.

Referring to FIG. 6, in operation 610, the content sharing server 500 may check whether the server has performed a synchronization with a terminal, using the connector 510.

For example, the terminal may maintain a service code for one or more contents. An example of the terminal is the content sharing apparatus 100 described with reference to FIGS. 1 and 2.

As described above, the service code may be generated by classifying contents into groups and by assigning a code corresponding to a command list for a group, such as a group of photos.

In operation 620, when the synchronization with the terminal is performed, the content sharing server 500 may check a service code generation history, and may determine whether a new service code is generated using the service code checker 520.

For example, the content sharing server 500 may determine whether there is a new service code that is automatically generated during the synchronization.

In operation 630, when it is determined that the new service code is generated, the content sharing server 500 may upload the service code, and the contents associated with the service code, using the content uploading unit 530.

For example, when the content sharing apparatus 100 generates a service code to share a group of six photos, the group of photos may be uploaded to the server, after the content sharing apparatus 100 and the server are synchronized.

In this example, when the terminal is synchronized through a wireless communication, the content uploading unit 530 may automatically upload the service code and the one or more contents based on setting information that is set in advance.

Additionally, the content sharing server 500 may generate a Uniform Resource Location (URL) for the uploaded contents using an address generator 540 shown in FIG. 5. The URL may include a variety of information, for example, information regarding a domain ID, an ID of a user of the terminal, an ID of the terminal, and a day and time when the service code is uploaded.

The content sharing server 500 may manage the uploaded photos so that access to the generated service code may be enabled. For example, if a physical URL through which a user may view six files is "http://zoomin.co.kr/userid/20070918", when a service code "00195131" is input, the content sharing server 500 may control redirection to the URL.

In this example, when one or more codes are generated, the content sharing server 500 may repeat the above operation until all of the codes are handled. For example, when photos 1 through 7 are provided to subject A, photos 3 through 6 are provided to subject B, and photos 7 through 9 are provided to subject C, the content sharing server 500 may upload the photos based on three service codes for three target people A, B and C, in control of three target terminals such as a first terminal, a second terminal, and a third terminal, respectively. Additionally, when multiple identical photos exist, only a single original copy of the photos needs to be uploaded for the original photo to be shared by multiple terminals based on multiple service codes.

Additionally, the content sharing server 500 may generate a table, using a table generator 550 shown in FIG. 5. For example, the table may connect the URL, the service code, and the command list with each other.

In operation 640, when a signal to request the one or more contents associated with the service code is received, the content sharing server 500 may extract the URL, the command list, and the one or more contents corresponding to the service code from the table, using a content extractor 560 shown in FIG. 5.

When a user inputs a service code and transmits it to the server, before the content sharing server 500 may set contents to be provided to a user, the user may be authenticated through an additional user authentication.

For example, the content sharing server 500 may perform the user authentication based on the extracted contents, and may control the one or more contents to be provided to a user that is successfully authenticated by the user authentication, using an authentication unit 570 shown in FIG. 5.

Hereinafter, a scheme for sharing and receiving contents by inputting a service code generated by a content sharing apparatus is described.

According to various embodiments, a subject may input a service code by accessing a server, to download only desired contents. The server may be used to provide a content sharing service.

The input service code itself may be recognized as a unique code even when a separate membership joining process is not performed. Thus, the subject may download desired contents by inputting the service code, without the user authentication.

However, when the user authentication is set to be performed as described above, the subject may be authenticated by inputting a password, or the like, before the user may download desired contents.

A client provided by the server may be implemented as a web page, or as a separate client program. In addition, the client may provide a service code input window in the form of a widget, rather than directly accessing a corresponding service. Accordingly, a service corresponding to a service code may be provided to anyone that installs a corresponding widget in a web service, such as a blog or on Facebook®, and who inputs the service code to the widget.

For example, when a service code is generated in the form of a barcode or a quick response (QR) code which enable video recognition, a webcam may be used to recognize the code.

According to various embodiments, the service code may be input using apparatuses other than a computer. For example, when a generated service code is input to a printer connected to a network, a content sharing apparatus may download a photo directly from a web site, and may print the downloaded photo, without performing a synchronization with a computer. Additionally, a digital frame may display the downloaded photo immediately after the downloaded photo is input to the digital frame.

The content sharing apparatus according to various embodiments may easily receive contents using a service code from other devices, for example a digital camera or an e-book, so that contents may be shared.

Furthermore, according to various embodiments, when an application is separately installed, a service code may be input through a menu included in the application. Alternatively, when a web browser is installed, the service code may be input by accessing to a web service.

In some embodiments, the content sharing apparatus may use an electronic tag, such as an RFID tag, instead of a printed code. For example, when link information is stored in an electronic tag, and when information included in the electronic tag is transmitted, the content sharing apparatus may receive a service code through an RFID antenna, and may provide contents associated with the service code.

When the content sharing apparatus generates a service code while connected to a wireless network, for example Wireless Broadband (WiBro), or Wi-Fi, contents may be shared in real-time.

For example, contents may be uploaded in real-time in a background as soon as a service code is generated and transmitted. Additionally, a subject receiving the service code may directly input the received code. Thus, it is possible to transmit contents using a peer-to-peer scheme.

Hereinafter, an overall process of a content sharing method is described with reference to FIG. 7.

FIG. 7 illustrates an example of a content sharing method between a supply terminal, a server, and a demand terminal.

For convenience of description, a terminal used to generate a service code for contents is referred to as a "supply terminal", and a terminal used to receive provided contents is referred to as a "demand terminal". Additionally, a device used to upload and manage contents and service code is referred to as a "server."

In operation 701, a user of the supply terminal may generate contents, and, in operation 702, may select a predetermined content from among the generated contents, using the supply terminal. Additionally, the user of the supply terminal may select a command for the selected content, and may control the supply terminal to generate a service code in operations 703 and 704.

The user of the supply terminal may provide the server with the service code, by performing a synchronization between the supply terminal and the server in operation 705.

When the supply terminal is connected to the server in operation 706, in operation 707 the server may determine whether a new service code has been generated. Additionally, the server may upload a command and the contents corresponding to the service code in operation 708. The server may map the corresponding service code to a URL for the contents in operation 709.

A user may access a homepage of a service which provides contents in operation 710. In operation 711, the user may input only the service code. The demand terminal may execute a command corresponding to the contents in operation 712.

Accordingly, it is possible to easily share contents by sharing only a service code. A user that desires to receive contents may input merely a service code without complicated selection operations, so that the contents may be provided to the user. Therefore, it is possible to extensively use various devices to share contents by inputting a service code to a terminal, or to play back contents by inputting a service code to the terminal. In addition, it is possible to manage contents for each service code.

As described herein, a first terminal may generate a service code with respect to contents a user of the first terminal desires to share. The first terminal may transmit the contents and the service code to a server. A user of a second terminal may access the contents of the first terminal by entering the service code into a menu of the second terminal, for example, an application menu, a web page, and the like. Accordingly, a user of a first terminal may share contents with a user of a second terminal immediately, without the need for an exchange of personal information such as an email address.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a to flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The above-described methods may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for sharing contents, the apparatus comprising:
   a storage unit configured to store contents;
   a content selector configured to receive a selection signal for one or more contents selected from among the stored contents;
   a group generator configured to classify the selected one or more contents into one or more groups of content;
   a code generator configured to generate a service code for a respective group of content, from among the one or more groups of content, based on one or more sharing commands applicable to a type of content within the respective group of content; and
   a transmitter configured to synchronize with a server and to transmit the service code and information for the respective group to the server,
   wherein the service code for the respective group represents the one or more sharing commands for sharing content which are commonly applicable to a plurality of different types of content, and the service code is automatically uploaded to the server in response to the apparatus being synchronized with the server through wireless communication and based on service code generation history that is accessible by the server, and
   the one or more sharing commands for respective content of the classified one or more contents include an access to the respective content.

2. The apparatus of claim 1, further comprising:
   a list output unit configured to output a list of the one or more commands,
   wherein the list comprises at least one of a content preview command, a content print command, and a content playback command.

3. The apparatus of claim 1, wherein the service code comprises at least one of:
   a letter code, a numeric code, an alphanumeric code, a two-dimensional (2D) code, a barcode, and a Radio-Frequency Identification (RFID) service code.

4. The apparatus of claim 1, further comprising an output unit configured to output the service code.

5. The apparatus of claim 4, wherein the output unit comprises:
   a display unit configured to display the service code on a screen; and
   an image output unit configured to convert the service code to image information and to output the image information.

6. The apparatus of claim 5, wherein the service code converted to the image information comprises at least one of a thumbnail and a code generation date.

7. The apparatus of claim 1, wherein the service code for the respective group represents the one or more sharing commands which are capable of being performed with respect to the respective content of the respective group by a receiver of the respective content.

8. The apparatus of claim 1, wherein the one or more sharing commands comprise providing information of the respective content to a terminal connected to the server or the apparatus via a network.

9. The apparatus of claim 1, wherein the one or more sharing commands are performed by a terminal connected to the server or the apparatus via a network.

10. The apparatus of claim 1, wherein the plurality of sharing commands comprise at least two commands from among printing, downloading, streaming, executing, read only, and thumbnail view, and the service code is generated based on which of the plurality of sharing commands are executable commands with respect to content within the respective group of content.

11. A content sharing server, the server comprising:
    a connector configured to check whether synchronization with a terminal is performed, the terminal being configured to maintain a service code for contents;
    a service code checker that uses at least one processor and which is configured to:

check a service code generation history of the terminal; and determine whether a new service code is generated at the terminal, in response to the synchronization with the terminal being performed, the new service code being for a respective group of content, from among one or more groups of content, and the new service code being based on one or more sharing commands applicable to a type of content within the respective group of content from among a plurality of sharing commands which are applicable to a plurality of different types of content; and a content uploading unit configured to upload the service code and the contents associated with the service code from the terminal to the server, in response to the new service code being generated, wherein the contents are classified into one or more groups, the service code for the respective group represents one or more commands which are commonly applicable to one or more contents classified into the respective group, the one or more commands for respective content for the classified one or more contents include an access to the respective content, and the service code is automatically uploaded to the server in response to the apparatus being synchronized with the server through wireless communication and based on the service code generation history that is accessible by the server.

12. The server of claim 11, further comprising an address generator configured to generate a Uniform Resource Location (URL) for the uploaded respective group of content.

13. The server of claim 12, wherein the URL comprises at least one of a domain identifier (ID), an ID of a user of the terminal, an ID of the terminal, and a day and time when the service code is uploaded.

14. The server of claim 12, further comprising a table generator configured to generate a table, the table connecting the URL, the service code, and a sharing command list applicable to the respective group of contents, with each other.

15. The server of claim 14, further comprising a content extractor configured to extract the URL, the sharing command list, and the respective group of contents from the table, based on the service code.

16. The server of claim 15, further comprising an authentication unit configured to:

perform a user authentication based on the extracted respective group of contents; and provide the respective group of contents to a user that is successfully authenticated by the user authentication.

17. A method of a terminal for sharing contents, the method comprising:

storing contents;

receiving a selection signal for one or more contents selected from among the stored contents;

classifying the selected one or more contents into one or more groups of content;

generating a service code for a respective group of content, from among the one or more groups of content, based on one or more sharing commands applicable to a type of content within the respective group of content;

synchronizing with a server; and transmitting the service code and information the respective group to the server, wherein the service code for the respective group represents the one or more sharing commands for sharing content which are commonly applicable to a plurality of different types of content, and the service code is automatically uploaded to the server in response to the apparatus being synchronized with the server through wireless communication and based on service code generation history that is accessible by the server, and the one or more sharing commands for respective content of the classified one or more contents include an access to the respective content.

18. The method of claim 17, further comprising:

displaying the service code on a screen; and converting the service code to image information and outputting the image information.

19. A method of a server for sharing contents, the method comprising:

checking whether a synchronization with a terminal is performed, wherein the terminal maintains a service code for contents;

checking a service code generation history of the terminal and determining whether a new service code is generated at the terminal, in response to the synchronization with the terminal being performed, the new service code being for a respective group of content, from among one or more groups of content, and the new service code being based on one or more sharing commands applicable to a type of content within the respective group of content from among a plurality of sharing commands which are applicable to a plurality of different types of content; and automatically uploading the service code and the contents associated with the service code from the terminal to the server, in response to the new service code being generated, in response to the terminal being synchronized with the server through wireless communication, and based on the service code generation history that is accessible by the server, wherein the contents are classified into one or more groups, the service code for the respective group represents one or more commands which are commonly applicable to one or more contents classified into the respective group, and the one or more commands for respective content of the classified one or more contents include an access to the respective content.

20. The method of claim 19, further comprising extracting the contents associated with the service code, in response to a signal requesting the contents associated with the service code being received.

21. A computer-readable storage medium having stored therein program instructions configured to cause a processor to perform a method of a terminal for sharing contents, the method comprising:

storing contents;

receiving a selection signal for one or more contents selected from among the stored contents;

classifying the selected one or more contents into one or more groups of content;

generating a service code for a respective group of content, from among the one or more groups of content, based on one or more sharing commands applicable to a type of content within the respective group of content;

synchronizing with a server; and transmitting the service code and information for the respective group to the server, wherein the service code for the respective group represents the one or more sharing commands for sharing content which are commonly applicable to a plurality of different types of content, and the service code is automatically uploaded to the server in response to the apparatus being synchronized with the server through wireless communication and based on service code generation history that is accessible by the server, and the one or more sharing commands for respective content of the classified one or more contents include an access to the respective content.

* * * * *